United States Patent
Belloso

(10) Patent No.: US 6,572,162 B2
(45) Date of Patent: Jun. 3, 2003

(54) AUTOMOBILE PROTECTIVE SYSTEM

(76) Inventor: Gregorio M. Belloso, 5302 Chinaberry Dr., Salisbury, MD (US) 21801

( * ) Notice: Subject to any disclaimer, the term of this patent is extended or adjusted under 35 U.S.C. 154(b) by 0 days.

(21) Appl. No.: 09/921,435

(22) Filed: Aug. 3, 2001

(65) Prior Publication Data

US 2003/0025342 A1 Feb. 6, 2003

(51) Int. Cl.$^7$ .............................................. B60R 19/26
(52) U.S. Cl. ........................ 293/132; 296/35.2; 296/189
(58) Field of Search ........................... 293/1, 132, 109, 293/102, 134, 122, 117, 133, 137, 129, 135; 180/232, 274, 275; 280/784; 296/35.1, 35.2, 68.1, 189, 188; 267/265

(56) References Cited

U.S. PATENT DOCUMENTS

| | | | | |
|---|---|---|---|---|
| 1,141,248 A | * | 6/1915 | Kadlec | 296/35.1 |
| 2,446,609 A | * | 8/1948 | Reed | 296/35.2 |
| 2,929,637 A | * | 3/1960 | Papacosta | 296/68.1 |
| 3,162,479 A | * | 12/1964 | Hewitt | 293/137 |
| 3,219,384 A | * | 11/1965 | Graham | 296/188 |
| 3,383,077 A | * | 5/1968 | Noviello, Jr. | 296/35.2 |
| 3,423,124 A | * | 1/1969 | Hewitt | 296/35.2 |
| 3,476,434 A | * | 11/1969 | Coyle | 296/35.2 |
| 3,508,783 A | * | 4/1970 | Schlanger | 293/117 |
| 3,589,466 A | * | 6/1971 | Dudley | 296/35.2 |
| 3,695,629 A | * | 10/1972 | Schlanger | 296/35.2 |
| 3,743,347 A | * | 7/1973 | Shaw | 296/35.2 |
| 3,806,184 A | * | 4/1974 | Dean | 293/1 |
| 3,831,998 A | * | 8/1974 | Hewitt | 296/35.2 |
| 3,837,422 A | * | 9/1974 | Schlanger | 296/35.2 |
| 3,869,017 A | * | 3/1975 | Feustel et al. | 180/232 |
| 3,904,237 A | * | 9/1975 | Barenyi et al. | 293/134 |
| 3,971,588 A | * | 7/1976 | Bauer | 280/784 |
| 4,431,221 A | * | 2/1984 | Jahnle | 293/132 |
| 4,579,367 A | * | 4/1986 | Manning | 293/129 |
| 4,823,905 A | * | 4/1989 | Piech | 180/274 |
| 4,826,209 A | * | 5/1989 | Farris | 296/35.2 |
| 5,335,745 A | * | 8/1994 | Goor | 180/232 |
| 5,409,262 A | * | 4/1995 | McLennan | 296/189 |
| 5,451,077 A | * | 9/1995 | Fantauzzo | 293/135 |
| 5,464,266 A | * | 11/1995 | Guertler | 293/109 |
| 5,738,378 A | * | 4/1998 | Yazejian | 296/35.2 |
| 5,785,368 A | * | 7/1998 | Hartmann et al. | 293/134 |
| 5,992,555 A | * | 11/1999 | Sakamoto et al. | 180/232 |
| 6,027,159 A | * | 2/2000 | Baumann | 296/189 |
| 6,105,507 A | * | 8/2000 | Jelf et al. | 180/275 |
| 6,371,466 B1 | * | 4/2002 | Spears | 267/265 |

* cited by examiner

*Primary Examiner*—Kiran Patel
(74) *Attorney, Agent, or Firm*—Norman B. Rainer

(57) ABSTRACT

An automobile which affords increased safety to its occupants and sustains minimal damage during a frontal collision includes elongated force-transmitting members that extend between front and rear bumpers in slidably telescopic interaction with the chassis of the automobile. Energy-absorbing springs receive force from a rearwardly displaced rear bumper during a frontal collision, and impart a rearward pulling effect on the automobile.

14 Claims, 6 Drawing Sheets

AUTOMOBILE PROTECTIVE SYSTEM

BACKGROUND OF THE INVENTION

1. Field of the Invention

This invention relates to systems for minimizing damage to an automobile and injury to its occupants in a frontal collision, and more particularly concerns automotive vehicles having front energy-absorbing means and a movable passenger compartment.

2. Description of the Prior Art

U.S. Pat. Nos. 3,508,783; 3,695,629; 3,589,466; 5,738,373; 3,806,184; 3,743,347 and 3,479,080 describe passenger compartments which, upon frontal impact, slide forwardly and upwardly. Such movement protects the occupant from injury by providing a longer effective stopping distance and causing the occupant's body to assume a semisupine position which can more effectively cope with impact force. None of these patents, however, provide means for making the vehicle itself particularly less damageable.

U.S. Pat. No. 3,848,886 describes an impact-absorbing frame system with telescoping bumper mounts and a frame equipped with energy absorbing sections which collapse on impact. Again, this does not make the vehicle itself particularly less damageable.

U.S. Pat. No. 4,232,755 describes an electric motor vehicle divisible into separable front, middle and rear sections. The middle section includes a passenger compartment that slides fore and aft in a collision. However, the compartment does not tilt the passenger to a protective semisupine position. Aside from the telescoping bumper mounts it has no further means for minimizing collision damage.

U.S. Pat. No. 3,476,434 describes an automotive vehicle having a shock mounted passenger-carrying area which is free to move horizontally, whereby deceleration forces on the passengers are dissipated more slowly. It has no means for making the vehicle less damageable.

U.S. Pat. No. 3,560,041 describes a driver/passenger compartment mounted on a separate chassis, with shock-absorbing means between them. It describes extensive interior padding to protect the occupants from head to foot but has no means for making the vehicle less damageable.

U.S. Pat. Nos. 5,941,582; 5,884,959 and 4,441,751 describe various means for improving the impact-absorbing capacity of front bumper assemblies. The impact force of the collision is thus ultimately transmitted to the frame. There are no provisions for making the frame itself less prone to damage from this force.

U.S. Pat. No. 5,451,077 describes a resilient safety bumper and a two-piece frame. The bumper partially absorbs the impact, and the front section of the frame swivels sideways to further protect the passenger-carrying rear section from impact shock. It has no means for making the vehicle as a whole less damageable.

In U.S. Pat. Nos. 4,192,538; 4,411,462; 4,518,183 and 4,176,858, the bumper assembly utilizes an air container means such as an air bag to improve its impact-absorbing capacity. The bumper assembly is mounted to the adjacent portion of the vehicular frame, to which the impact force of the collision, albeit dampened, is ultimately transmitted. They do not include means for making the frame itself less deformable or less damageable.

U.S. Pat. No. 4,065,169 describes an energy transforming means which allows an upward movement of a truck's rear body, exclusive of the passenger compartment, to absorb kinetic energy of the body upon collision. It does not describe a separate passenger compartment slidably mounted on the chassis and does not describe means for making the vehicle less damageable.

It is evident from the above that although many patents address the problem of passenger safety and address the matter of improving the impact-absorbing capacity of the bumper assembly, none of them present means for making the vehicle itself less damageable, particularly its frame or chassis. It is well known that a bent frame or chassis is frequently the reason for declaring the vehicle a total loss.

SUMMARY OF THE INVENTION

It is accordingly the primary object of this invention to provide a vehicle that is not only safer for its occupants during a frontal collision but also one that is less damageable. It achieves this by a novel approach based on the observation that a hollow body in motion such as an automobile whose structural integrity is maintained by a deformable framework is more apt to sustain damage and deformity if its motion is halted by a compressive force applied to its leading aspect ("a push from the front") than if its motion is stopped by an equal traction force acting on its rear aspect ("a pull from behind"). This is because in general the materials used in automobiles such as the chassis is more apt to be bent when pushed from the front end than when pulled (to a stop) from the rear end, other factors being equal. That is, they are better able to withstand tensile stress than compressive or bending stress.

The novel approach used in this invention is the means for instantaneous transfer of the impact force from the front bumper to the rear bumper, making it possible to use the rear bumper as a strong anchor from which to exert a strong controlled traction force ("pull from behind") on the chassis and thereby gradually pull the chassis and the rest of the vehicle to a controlled stop.

Another purpose of this invention is to reduce the cost of manufacture by using standard off-the-shelf parts such as the illustrated leaf springs and shock absorbers, and straight tubular members for the chassis and bumper supports which are not only inexpensive to fabricate but are also less apt to be deformed when subjected to strong axially directed forces like those that occur during frontal collisions.

BRIEF DESCRIPTION OF THE DRAWING

With these and other advantages in view, the invention is disclosed in the following description which will be more fully understood when it is read in conjunction with the accompanying drawings in which.

Figure 1:
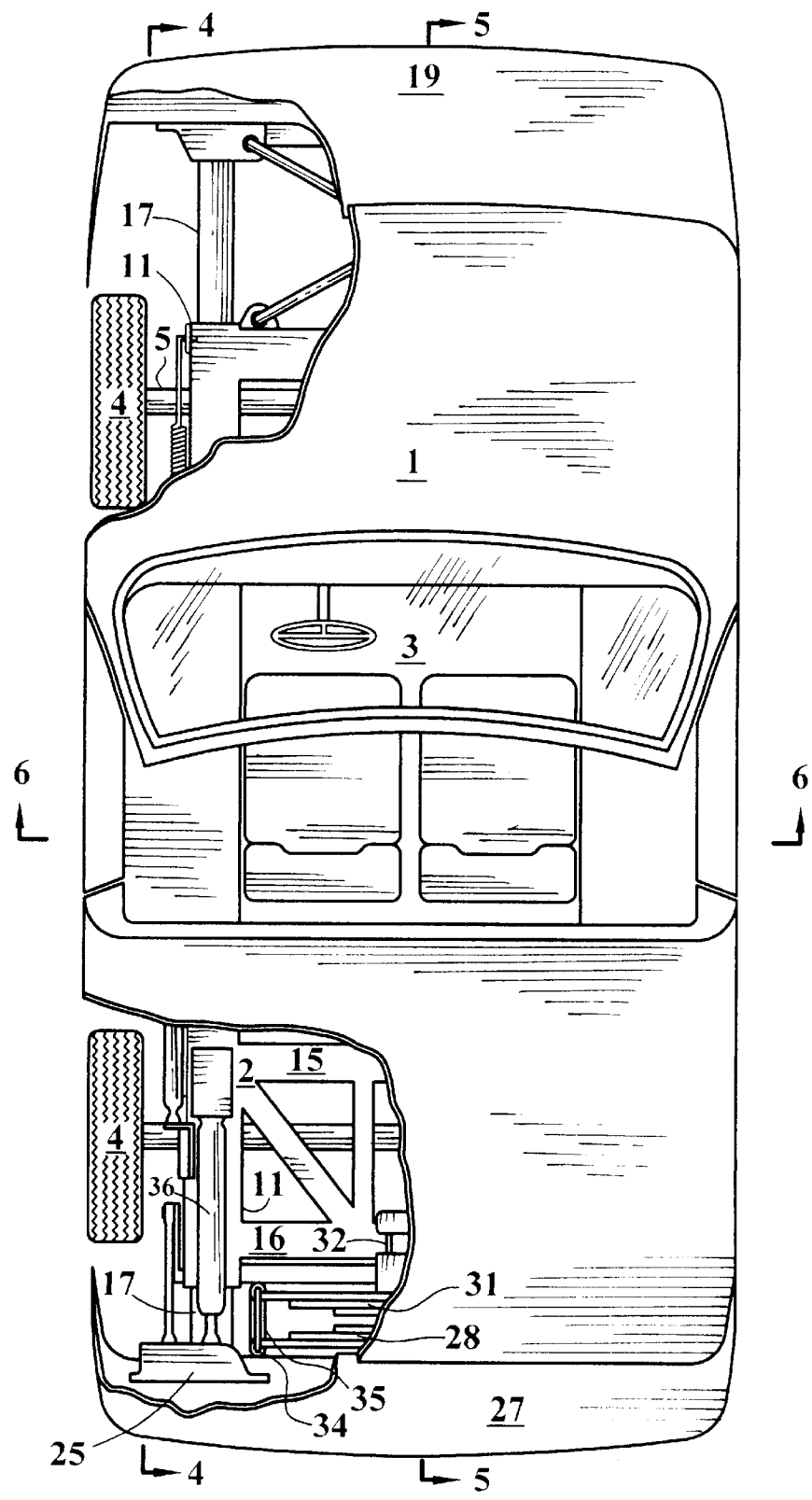
FIG. 1 is a top view, partially in section, of an automotive vehicle having an embodiment of the protective system of this invention.
Figure 2:
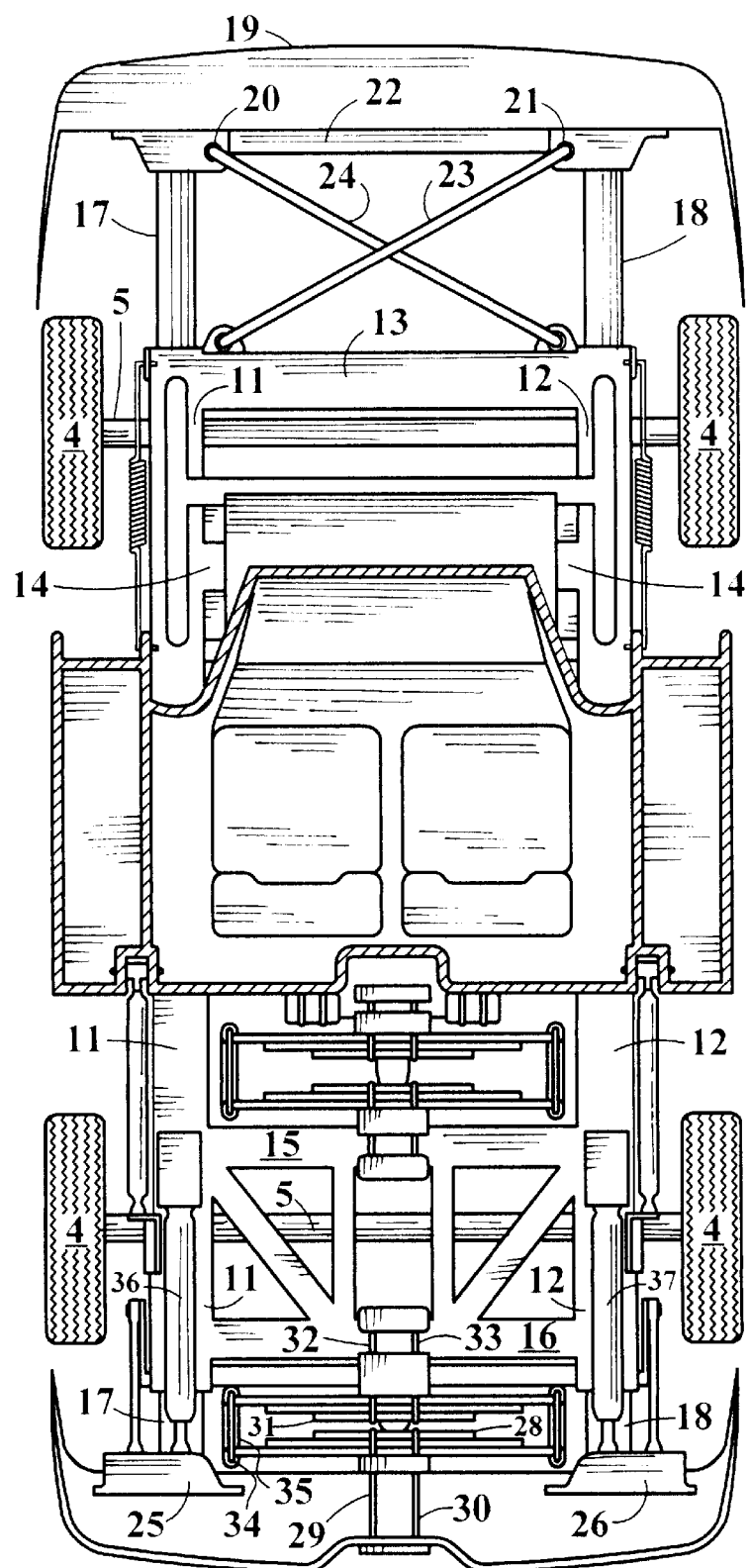
FIG. 2 is a horizontal sectional view of the embodiment of FIG. 2.
Figure 3:
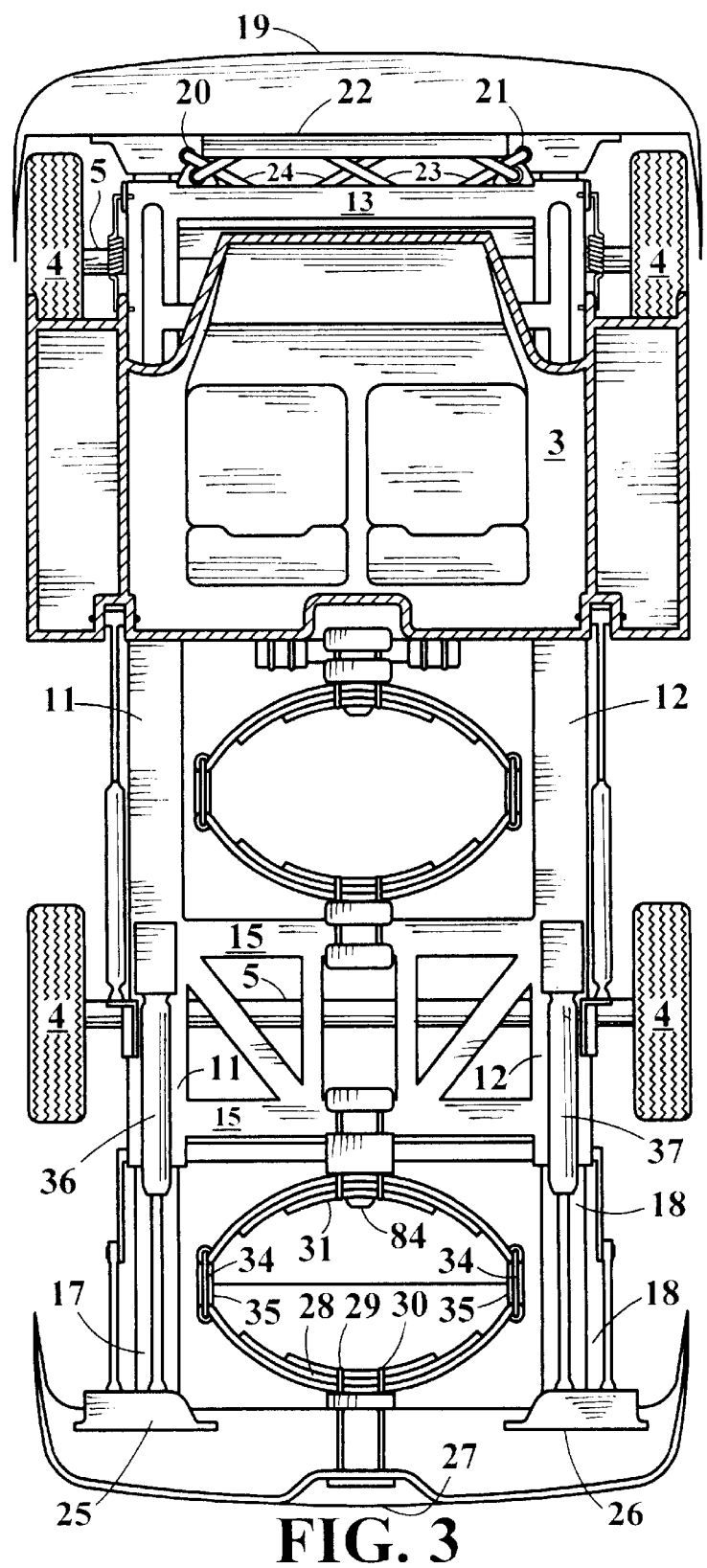
FIG. 3 is a view similar to FIG. 7, showing the state of the vehicle during a head-on collision.
Figure 4:
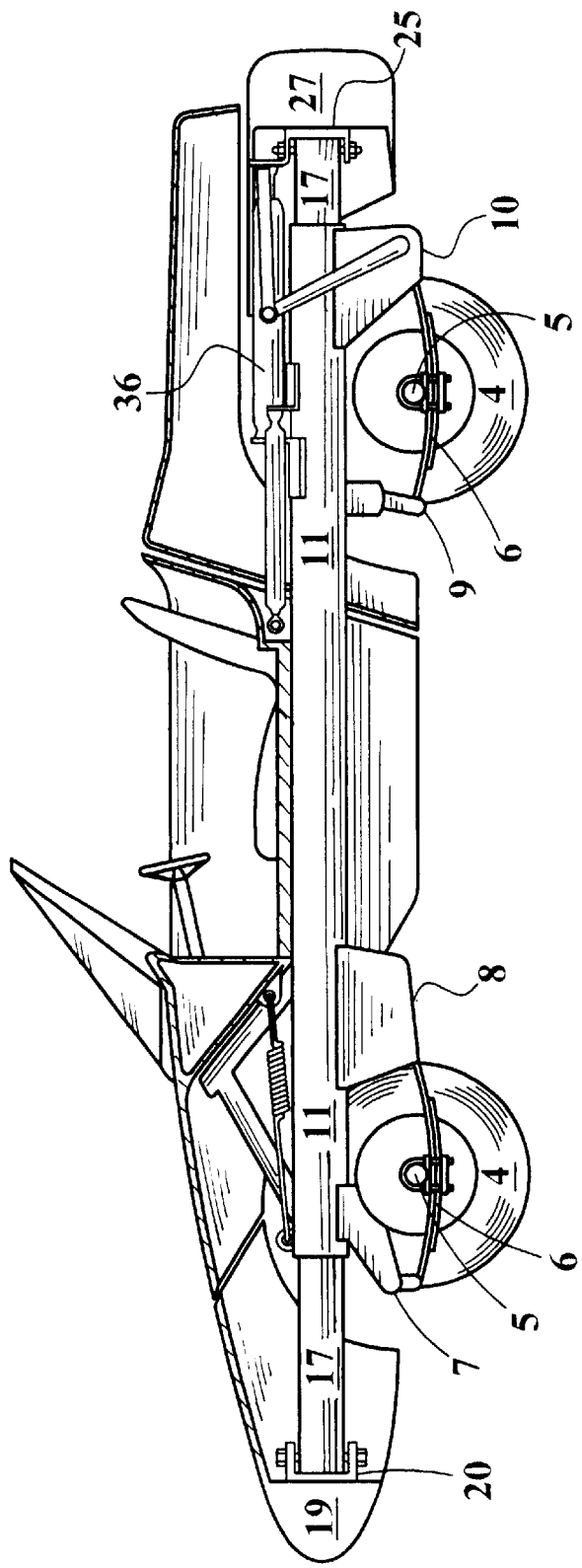
FIG. 4 is a sectional view taken along line 4—4 of FIG. 1.
Figure 5:
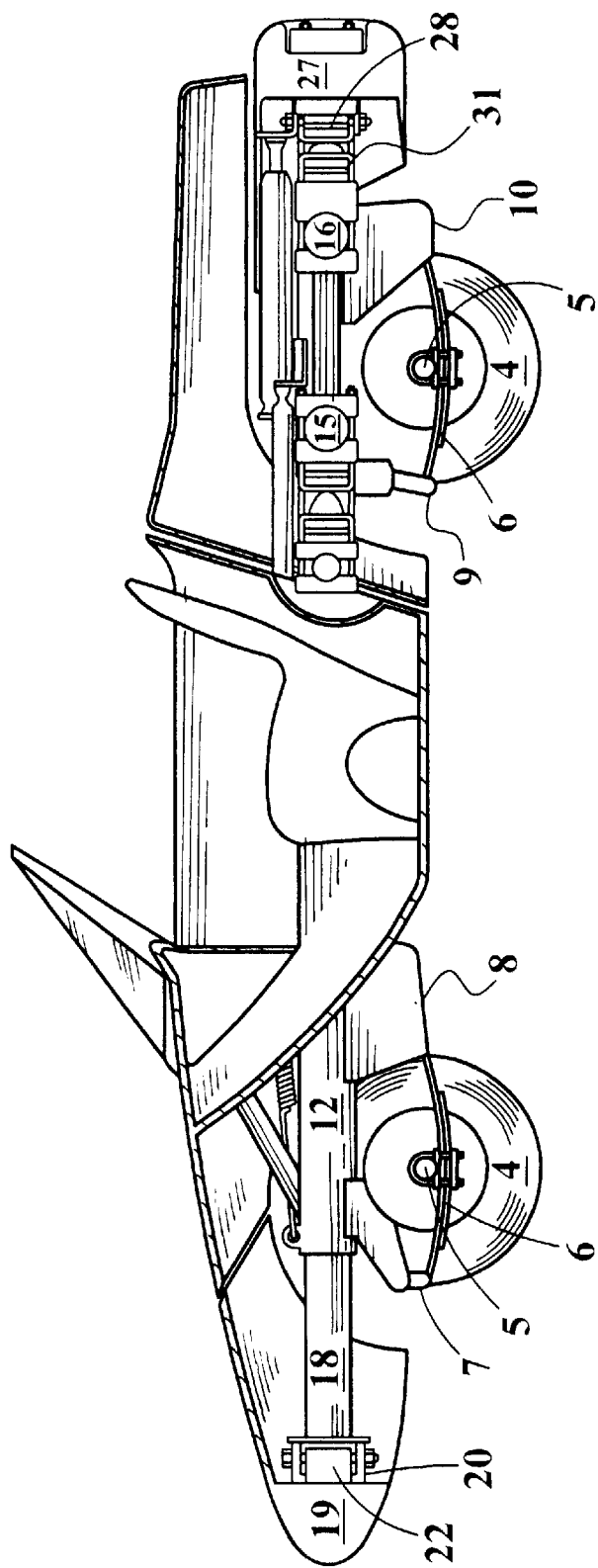
FIG. 5 is a sectional view taken along line 5—5 of FIG. 1.
Figure 6:
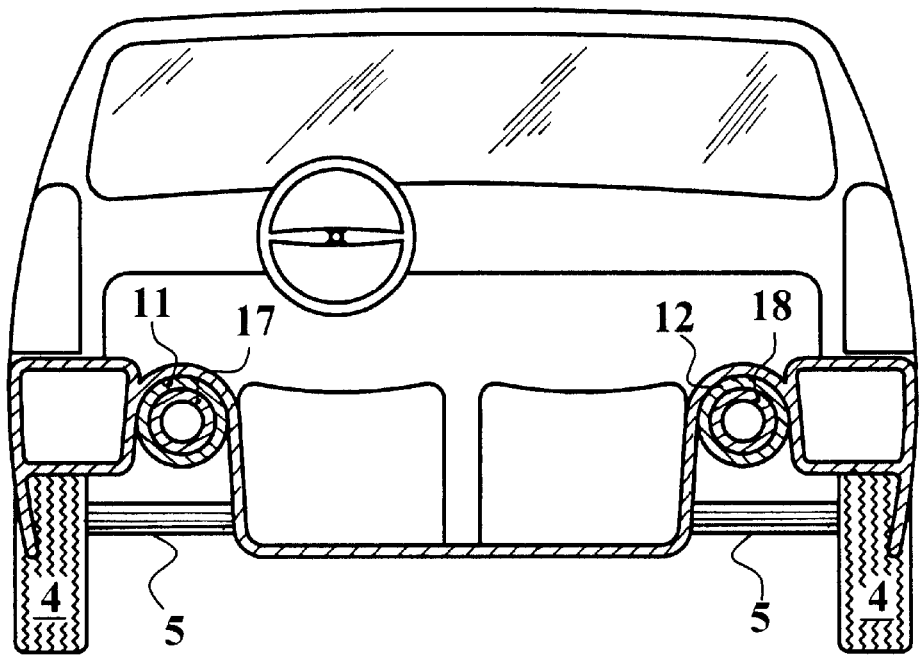
FIG. 6 is a sectional view taken along line 6—6 of FIG. 1.

For clarity of illustration, details which are not relevant to the invention, such as the engine, power train, internal air bags, etc., have been omitted from the aforesaid drawings.

DESCRIPTION OF THE PREFERRED EMBODIMENT

Referring now to the above drawings wherein one character designates one part of the vehicle, there is shown an automobile 1, with chassis 2 and passenger module 3. Supporting the chassis 2 are wheels 4 journaled to axles 5 attached to springs 6 which are anchored to chassis 2 by front leading hangers 7, front trailing hangers 8, rear leading hangers 9, and rear trailing hangers 10.

The chassis 2 is composed of left tubular longitudinal member 11 and right tubular longitudinal member 12 which are fixedly attached to each other by front cross member 13, second cross member 14, third cross member 15 and rear cross member 16, forming a rigid "ladder" configuration.

Snugly but movably fitted inside left tubular longitudinal member 11 is left tubular bumper support 17, and similarly mounted inside right tubular longitudinal member 12 is right tubular bumper support 18; said fit being snug enough to prevent rattling, but loose enough to permit forward and backward movement of the bumper supports 17 and 18 within the members 11 and 12. Lubrication with grease facilitates such movement.

The front bumper is attached to the bumper supports 17 and 18 by hinges 20 and 21 which allow hinge motion-on a horizontal axis but not on a vertical axis. The hinges 20 and 21 are movably attached to bumper 19 in a manner that allows lateral sliding motion of hinges 20 and 21 relative to bumper 19. Hinge stopper 22 attached to bumper 19 prevents hinges 20 and 21 from being moved towards each other during a collision.

A prestressed cable 23 anchors right hinge 21 to the left end of front cross member 13, and a similar cable 24 anchors left hinge 20 to the right end of front cross member 13. Said cables prevent sideward displacement of front bumper 19 and sideward bending deformity of tubular bumper supports 17 and 18 during an offset frontal collision, yet these cables do not impede the rearward telescoping motion of the bumper supports 17 and 18 through the tubular longitudinal members 11 and 12 of the chassis 2.

The tubular bumper supports 17 and 18 extend substantially forward from the front end of chassis 2 and extend rearward from the rear end of chassis 2 as well. Rear bumper hinges 25 and 26 attach rear bumper 27 to the rear ends of tubular bumper supports 17 and 18 in a manner similar to the hinged attachments of front bumper 19.

Rear bumper leaf spring 28 is fixed to the rear bumper 27 by clamps 29 and 30; and rear cross member leaf spring 31 is fixed to the rear cross member 16 by clamps 32 and 33. Rear bumper leaf spring 28 is movably attached at each end to the corresponding ends of rear cross member leaf spring 31 by U-bolts 34 and straps 35 so that together their spring action controllably restrains rearward movement of rear bumper 27 relative to the chassis 2. When in their unstressed, resting state, the leaf springs 28 and 31 are pre-loaded so that their ends pull against each other through their linkage with U-bolts 34 and straps 35, with a force of about 500 to 800 lbs. This preload force is borne by rubber bumper 84, attached to leaf spring 31, which stops this force from causing direct contact between leaf spring 28 and rear cross member leaf spring 31. This arrangement prevents rearward movement of the rear bumper 27 relative to chassis 2 unless it is subjected to a rearward force in excess of the spring preload stated above.

During a frontal collision, when the impact force exceeds the spring preload of 500 to 800 lbs., the front bumper 19 is pushed rearward, causing the tubular bumper supports 17 and 18 to telescope rearward within chassis 2 and push rear bumper 27 rearward. This motion is controllably resisted by leaf springs 28 and 31 and dampened by shock absorbers 36 and 37. This results in a controlled gradual stoppage of the forward motion of chassis 2. Thus the forward motion of the main mass of the vehicle is stopped through a controlled pull on the chassis from behind rather than by a strong sudden blow from the front which would be more damaging and deforming to the vehicle, particularly the chassis.

The passenger module 3 may be constructed as a separate unit, seated on the chassis 2 in a manner that allows it to glide forward and tilt upward during a collision.

After the collision, the return action of rear bumper leaf spring 28 and rear cross member leaf spring 31 pulls the rear bumper 27 back to its original position; the rear bumper 27 in turn pushes tubular bumper supports 17 and 18 forward, thus causing them to return front bumper 19 to its original forward position. This return movement is dampened by shock absorbers 36 and 37.

It may be seen from the foregoing description that in addition to providing means for reducing vehicular damage and passenger injury through temporary displacement of certain parts of the vehicle, the invention also provides for automatic return of these parts to their original position.

Although this preferred embodiment is described in great detail, it is to be understood that various changes and modifications may be made therein without departing from the spirit and scope of the invention which is more fully defined in the appended claims.

Having thus described my invention, what is claimed is:

1. In an automotive vehicle having a chassis which supports drive means, a passenger compartment, front and rear bumpers in spaced apart relationship upon a center longitudinal axis and paired front and rear wheels mounted upon axles transversely disposed to said axis, the improvement comprising connecting means interactive between said bumpers in a manner whereby force received by said front bumper in a frontal collision is transferred to said rear bumper.

2. The automotive vehicle of claim 1 wherein said connecting means comprise left and right straight rigid members elongated coextensively with said axis and equally spaced therefrom on opposite sides thereof.

3. The automotive vehicle of claim 1 wherein said connecting means are arranged to move slidably with respect to said chassis codirectionally with said axis.

4. The automotive vehicle of claim 1 wherein said passenger module is adapted to move forwardly and tilt upwardly upon the occurrence of a frontal collision.

5. The vehicle of claim 4, wherein said energy-absorbing means comprise leaf springs.

6. The vehicle of claim 1 further comprised of left and right hinges attached to said front bumper and to which said left and right connecting means, respectively, are attached.

7. The vehicle of claim 6 wherein said hinges allow motion in a horizontal direction but not in a vertical direction.

8. The vehicle of claim 3 wherein said chassis has paired tubular components which receive said connecting means in telescopically slidable relationship.

9. The vehicle of claim 4 wherein said energy-absorbing means is comprised of at least one horizontally disposed leaf spring having opposed ends equally spaced from said longitudinal axis.

10. The vehicle of claim 9 wherein said energy-absorbing means is comprised of front and rear leaf springs in spaced apart coplanar relationship in flexurally opposed disposition and interactively joined at their opposed ends.

11. The vehicle of claim 10 wherein the space between said leaf springs increases by flexural bowing action when a rearwardly directed pulling force is applied to said rear spring.

12. The vehicle of claim 11 wherein said rear leaf spring is centrally attached to said rear bumper, whereby force rearwardly imparted to said rear bumper by way of said connecting means in response to a frontal collision produces a rearward pulling action on said rear leaf spring.

13. The vehicle of claim 12 wherein said leaf springs are pre-stressed with a force of 500 to 800 pounds that urges said front and rear springs together, whereby the space between said springs will not increase until a pulling force is applied greater than said pre-stressed force.

14. The vehicle of claim 13 wherein a rubber bumper is interposed centrally between said front and rear leaf springs to prevent their contact in said pre-stressed condition.

\* \* \* \* \*